United States Patent
Orozco et al.

(10) Patent No.: US 11,119,747 B2
(45) Date of Patent: Sep. 14, 2021

(54) SYSTEM AND METHOD FOR APPLICATION RELEASE ORCHESTRATION AND DEPLOYMENT

(71) Applicant: PayPal, Inc., San Jose, CA (US)

(72) Inventors: José Marvin Xuya Orozco, Guatemala (GT); Juan Rodolfo Mejia, Guatemala (GT); Javier Aroche, Guatemala (GT)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/691,551

(22) Filed: Nov. 21, 2019

(65) Prior Publication Data
US 2021/0157560 A1 May 27, 2021

(51) Int. Cl.
| | |
|---|---|
| *G06F 8/65* | (2018.01) |
| *G06F 8/35* | (2018.01) |
| *G06F 9/44* | (2018.01) |
| *G06F 8/60* | (2018.01) |
| *G06F 11/36* | (2006.01) |
| *G06F 8/61* | (2018.01) |
| *G06F 11/34* | (2006.01) |
| *G06F 8/71* | (2018.01) |
| *G06F 8/10* | (2018.01) |
| *G06F 8/70* | (2018.01) |

(52) U.S. Cl.
CPC ............ *G06F 8/60* (2013.01); *G06F 11/3688* (2013.01); *G06F 8/10* (2013.01); *G06F 8/35* (2013.01); *G06F 8/61* (2013.01); *G06F 8/65* (2013.01); *G06F 8/70* (2013.01); *G06F 8/71* (2013.01); *G06F 11/3419* (2013.01)

(58) Field of Classification Search
CPC ..... G06F 8/60; G06F 8/61; G06F 8/65; G06F 8/35; G06F 8/10; G06F 8/70; G06F 8/45; G06F 8/71; G06F 8/30; G06F 11/3688; G06F 11/3419; G06F 11/36; G06F 11/008
See application file for complete search history.

(56) References Cited

U.S. PATENT DOCUMENTS

| | | | |
|---|---|---|---|
| 9,582,408 B1 * | 2/2017 | Jayaraman | G06F 11/3672 |
| 9,817,657 B2 * | 11/2017 | Hill | G06F 8/70 |
| 10,474,438 B2 * | 11/2019 | Bijani | G06F 8/10 |
| 2002/0004824 A1 * | 1/2002 | Cuan | G06F 16/958 |
| | | | 709/208 |
| 2009/0300580 A1 * | 12/2009 | Heyhoe | G06F 8/70 |
| | | | 717/106 |
| 2015/0025925 A1 * | 1/2015 | Moore | G06Q 10/063 |
| | | | 705/7.11 |

(Continued)

OTHER PUBLICATIONS

Carlene Lebeuf et al., Software Bots, IEEE, Jan.-Feb. 2018, [Retrieved on Feb. 28, 2021]. Retrieved from the internet: <URL: https://ieeexplore.ieee.org/stamp/stamp.jsp?arnumber=8239928> 6 Pages (18-23) (Year: 2018).*

(Continued)

*Primary Examiner* — Anibal Rivera
(74) *Attorney, Agent, or Firm* — Haynes and Boone, LLP

(57) ABSTRACT

Aspects of the present disclosure involve systems, methods, devices, and the like for application release and orchestration. In one embodiment, a system is introduced that can communicate with a centralized automation server via an autonomous program. The system centrally test and validate the code and application release using an iterative data deployment process.

20 Claims, 6 Drawing Sheets

(56) References Cited

U.S. PATENT DOCUMENTS

| | | | |
|---|---|---|---|
| 2015/0082281 A1* | 3/2015 | Koenig | G06F 11/008 717/124 |
| 2015/0135160 A1* | 5/2015 | Gauvin | G06F 8/71 717/109 |
| 2016/0124742 A1* | 5/2016 | Rangasamy | H04L 41/0803 717/103 |
| 2016/0132309 A1* | 5/2016 | Rajasekhar | H04L 67/16 717/102 |
| 2017/0068963 A1* | 3/2017 | Saxena | G06Q 10/063112 |
| 2019/0026085 A1* | 1/2019 | Bijani | G06F 8/35 |
| 2019/0034828 A1* | 1/2019 | Cagadas | G06N 20/00 |
| 2019/0073197 A1* | 3/2019 | Collins | G06F 3/0481 |
| 2019/0129701 A1* | 5/2019 | Hawrylo | G06F 8/65 |
| 2019/0129712 A1* | 5/2019 | Hawrylo | G06F 8/71 |
| 2019/0266280 A1* | 8/2019 | Acampado | G06F 9/455 |
| 2019/0317754 A1* | 10/2019 | Mosquera | G06Q 10/06316 |
| 2019/0347282 A1* | 11/2019 | Cai | G06K 9/6231 |
| 2019/0347668 A1* | 11/2019 | Williams | H04L 67/2833 |
| 2019/0391798 A1* | 12/2019 | Farrell | G06F 8/60 |
| 2020/0073639 A1* | 3/2020 | Prasad | G06N 20/00 |
| 2020/0142719 A1* | 5/2020 | Akbulut | G06F 16/3329 |
| 2020/0204431 A1* | 6/2020 | Bahrami | H04L 41/16 |
| 2020/0264897 A1* | 8/2020 | Popo | H04L 41/0806 |

OTHER PUBLICATIONS

Luis Fominaya, Chatbot API: A service to develop text-based interfaces, Jun. 28, 2017, [Retrieved on Feb. 28, 2021]. Retrieved from the internet: <URL: https://dspace.uib.es/xmlui/bitstream/handle/11201/151333/Memoria_EPSU0953.pdf?sequence=1> 54 Pages (1-54) (Year: 2017).*

* cited by examiner

SYSTEM AND METHOD FOR APPLICATION RELEASE ORCHESTRATION AND DEPLOYMENT

TECHNICAL FIELD

The present disclosure generally relates to intelligent information orchestration, and more specifically, to the use of a system for intelligent information orchestration and release.

BACKGROUND

Nowadays with the proliferation of electronics and rampant improvements in technology, users are constantly looking to remain connected. Such connectivity however, often requires software install and updates. In most instances, these updates require proper testing before release and can occur only after software has been properly tested and deployed. Such testing may be fragmented, cause delays, and in most instances require manual intervention. The manual intervention may include pushing notifications, adding new application structures, monitoring new applications, reviewing downtimes, checking hosts, and troubleshooting in the case of a crash. This type of manual intervention may be a challenge as time, funding, and customer experience may all be affected. Thus, it would be beneficial to have a system with the capability of orchestrating new code releases and deploying it with minimal or no human intervention.

Figure 1:
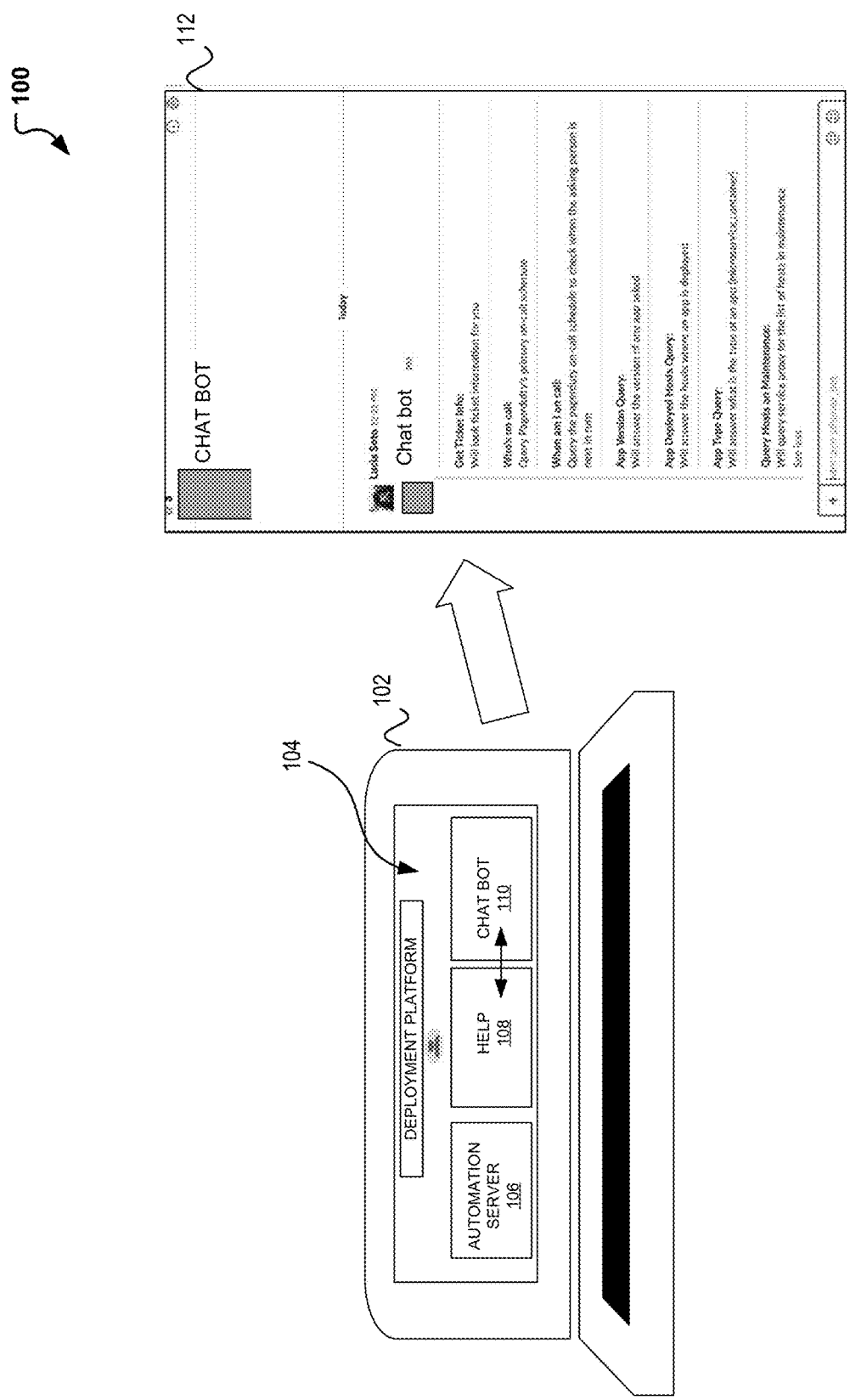
FIG. 1 illustrates a block diagram of an interaction with a deployment system interface.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for application release and orchestration. In one embodiment, a system is introduced that can communicate with a centralized automation server via an autonomous program. The system centrally test and validate the code and application release using an iterative data deployment process. In another embodiment, the centralized automation server in conjunction with production and staging environments for the execution of production scripts.

Code release and deployment systems are commonly used for the test and release of software. These types of systems often require manual intervention for maintaining version control to pushing notifications, to checking hosts and troubleshooting crashes. However, this type of manual intervention often requires involvement from numerous individuals and teams with access to the main server and for control of one or more tools. Involvement of such degree may be a challenge as time, cost, errors, and customer experience may all be affected. Thus, it would be beneficial to have a system with the capability of orchestrating new code releases and deploying it with minimal or no human intervention.

In one embodiment, a system and method are introduced for software and code deployment. The system may be designed to connect and orchestrate code releases while operating under self-containment. That is to say, the system may be designed to operate without the need for multi-team input. Instead, a system and method are introduced which operate with the use of a centralized software application, such as a chat bot, for running automated tasks or scripts. The chat bot may be available to execute commands including the orchestration, deployment and release of code. Thus, the system facilitates interactions across different tools and processes including those requiring more tailored applications and/or customizable services. Therefore, unlike conventional deployment systems, the current system improves execution, reduces error, and increases system flexibility by providing a customizable deployment system with a centralized chat bot used as the facilitator.

FIG. 1 presents an exemplary platform that may be used in communicating and executing on the customizable deployment system. In particular, FIG. 1 illustrates a block diagram of an interaction with a deployment system interface. As illustrated, the deployment system can include the use of a platform for interfacing with and communicating with the system. As exemplified here, the communication can occur via a user device 102. The user device 102 may be a tablet, iPad, cell phone, laptop, desktop, or the like. For exemplary purposes, user device 104 can be a laptop. The laptop may be equipped with various applications for performing various tasks including web browsing, video streaming, online transacting, coding, and other types of communicating. Additionally, the user device 102 be equipped with applications that enable the user to make purchases, write code, and work with various tools and other applications for updating, installing, deploying, and orchestrating code release systems. Further, the user device 102 is capable of making phone calls and communicating with one or more other communications devices using a cellular network, Wi-Fi, Bluetooth, BLE, NFC, WLAN, etc. The communication can enable the transmission of information from a user and to/from a remote deployment system.

At the user device 102 and for the communication with the remote deployment system, a deployment platform 104 may be available. The deployment platform may be a customizable user interface presented to a user for communicating with the remote deployment system. For example, at FIG. 1, a user device 102 is illustrated wherein a user is connected and communicating with the remote deployment system. The user may be connected via the deployment platform 104 which can enable a user to access the system directly through an automation server link 106, a help link 108, or a chat bot 110. Additional modes and methods for communicating may be available and those presented are for exemplary purposes.

The server link 106 is an exemplary method for communicating and interface with the deployment system wherein the automation server may be accessed directly for source automation. The automation server may be accessed via the deployment platform for the process, integration, build, test, and deployment of software. By using the automation server link 106 the user is able to directly interact with the server. However, as indicated above in some instances it is convenient to have a centralized mechanism for facilitating software release and deployment. As such, a chat bot 110 is integrated and introduced which can aid in minimizing human error, standardizing processes, and ensuring privileges are met before enabling changes and updates in the system. For example, some privileged tasks can include a change in infrastructure, an application restart, deployment, and specific maintenance options. Such privileged tasks should be checked and could be automatically verified in the communication and exchange with the use of a chat bot 110. Alternatively, other tasks or interactions including requesting ticket information, on-call information, and other general application status requests could be performed without the need for specific privileges and thus could be completed in a more flexible manner via the automation server link, help link 108 (which may be part of the chatbot 110), and/or the chat bot 110. In some embodiments, the privileges can be incremental where a first type of privilege may provide access to application information, a next type provides deployment, and so on until the highest privilege includes access to and ability to perform all tasks including change in infrastructure, deployment, status check, etc. In other embodiments, lesser or more privilege types may exist, and the privileges may be linked with the association to a team or organization. In other embodiments, the chat bot may be configurable based in part on the privileges or specified actions or options available to and requested by a user.

To illustrate some of the capabilities to the user, FIG. 1 presents an exemplary exchange 112 with the chat bot and the tasks available for a user. As illustrated in the exemplary exchange 112, the chat bot 110 has been selected for communicating with the remote deployment system. The chat bot 110 is communicating with user Lucia Soto who is considering what options (e.g., privileged tasks) are available to perform. To access the options in this instance, the user, Lucia Soto, may simple input <help> to obtain such details. In response, the chat bot 110 may list or enumerate the options available. In this exemplary embodiment, user Lucia Soto is able to obtain ticket and application information and type. For example, the Lucia may obtain ticket information, version of an application, host the application is deployed on, a listing of hosts being maintained, as well as other user's schedule and on-call information. As indicated earlier, the options available to a user may be based in part on a privilege and as such, another user may be presented with other options when requesting help from the chat bot 110.

In some instances, the chat bot 110 may be automatically launched and available for performing tasks. In other words, the chat bot 110 may also listen to conversations and/or spoken commands for input and responds with a matched action. Machine learning techniques, natural language processing, and models such as word2vec, tensor flow, supervised learning, artificial neural networks, etc. may be used for such responses. Thus, the chat bot 110 may be triggered with the user of natural language processing and/or use of specified keywords that would initiate an action. Additionally or alternatively, user biometrics may be used for authenticating and presenting the user with available options for interacting with the remote deployment system in conjunction with the automation server and/or chat bot 110. Artificial intelligence and virtual reality may also be incorporated with the access and control of the remote deployment system.

Figure 2:
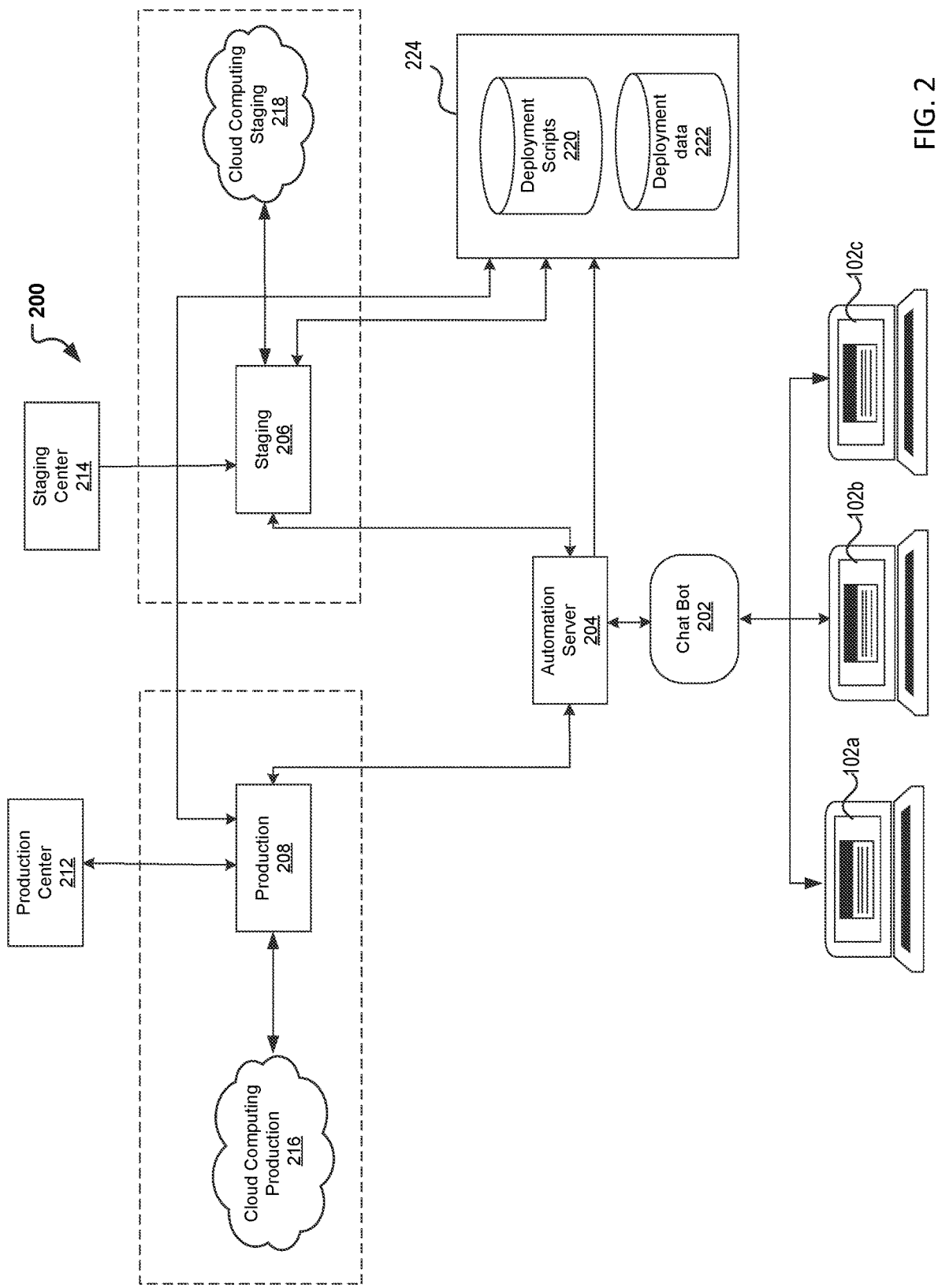
FIG. 2 illustrates a block diagram illustrating deployment system.

To better understand the orchestration of information and communication occurring, the architecture associated with the remote deployment system is presented and illustrated in FIG. 2. Specifically, FIG. 2 illustrates a block diagram illustrating deployment system 200. As indicated above, communication with the deployment system 200 begins with a user interacting with a deployment platform 104 on a user device 102. The interaction may derive from one or more users on one or more user devices 102a-102c. The users may request one or more actions from the deployment system 200 including but not limited to a request for application version, a listing of hosts being maintained, code release, etc. Actions which may be requested and available based in part on the user's privilege.

The action request may arrive through a direct request to the automation server 204 (e.g., via automation server link 106) and/or through the use of a centralized chat bot 202 (e.g., chat bot 110). Illustrated at FIG. 2 is an illustration of the use of the chat bot 202 as the main form of communication and exchange with the deployment system 200. The use of a chat bot 202 as the primary source of information provides an automated method of performing actions while minimizing potential errors. By enabling the use of the chat bot 202, actions become standardize, man-hours are reduced, live updates become more easily available, deployment timing is reduced, etc. Thus, the chat bot 202 is able to communicate directing with the automation server 204 without the need for direct human or intermittent interaction. The automation server 204 is then use to facilitate the completion of the actions requested including the orchestration of information and code release on the deployment system 200. For example, the chat bot 202 may receive a Slack command which may trigger a call to the automation server 204 with the necessary information to work properly and execute on the command. The chat bot 202 may be involved in the collection and verification of information necessary to start a job, and then proceed to trigger the job with the parameters collected. The chat bot 202 may then communicate with the automation server 204 and monitor the job until it finishes and provides the exit results to the automation server 204. As another example, the chat bot 202 may also receive a command to perform a basic query such as identifying which virtual machine an application is running on as part of the deployment system 200.

Deployment system 200 is therefore developed and enabled to provide such orchestration and code deployment in an infrastructure based on custom tools which are unable to connect with more generic tools or platforms than those that are conventionally used. Further, the deployment system allows for addition and use of other tools, in varying languages, in a customizable and flexible manner.

For exemplary purposes, deployment system 200 is introduced as a system for preforming such actions. In some embodiments, deployment system 200 is introduced with separate staging 206 and production 208 services available. The staging 206 may occur at one location in an environment distinct from the production 208 which may be at another location. Alternatively, staging 206 and production 208 may occur within the same environment and/or at a same location.

As such, the automation server 204 as exemplified, may sit between chat both locations, with the ability to accessed, change, or take action on, on either environment. Thus, the automation server 204 may enable continuous delivery and implementation of tools used for builds when a user has new code that may be pushed on the automation server 204. The automation server 204 may also manage the infrastructure and enable code deployment. In enabling the code deployment, the automation server 204 may present a web interface on the user device 102 for inspecting how the scripts are working with the chat bot 202, working as a middle man by helping route the communication between the users, the automation server, and the centers 212,214.

Turning back to FIG. 2, exemplary environments 206,208 are illustrated. Staging environment 206 is an environment where at least some of the software testing may occur. For example, code may be tested, updates made, and builds completed. The staging environment may be defined to ensure quality is achieved in a production-like environment before and application or code is deployed. Therefore, the automation server 204 may be created to aid in software testing before deployment and distinct from a production environment 208 for quality and assurance. The staging environment in this deployment system 200 may be a replica of the production environment 208 which aids in simulating and release management before deployment.

In some instances, deployment may occur separately and without staging. In these instances, the automation server 204 may communicate directly with the production environment 208 for urgent or minor changes that may not require staging and/or a full release. The production environment 208 may also be used to deploy new code, new versions, new configurations, etc.

Therefore, the production and staging environments 206, 208 may be used to take, retrieve, and manipulate the information as necessary for production. The staging and production environments 206,208 may be executed as a network of machines at datacenters 212,214, on a cloud (e.g., cloud computing staging 216, and cloud computing production 218 on virtual machines. The information collected and stored between the production and staging of the code may occur at the production and staging data centers 212,214.

In addition to the cloud 216,218, and data centers 212, 214, an additional repository may exist 224. The repository 224 may include at least some production or deployment scripts database 220 and deploy data database 222. This repository 224 may work as the source of truth for the deployment system 200 which can include control of when service is deployed and the metadata on how the service/deployment system 200 works. For example, the repository 224 can include details on which port and protocol the application will listen on and well as where it is deployed (what server and data center), as well as the scripts used. Note that is some embodiments, the metadata, code, and application information may also reside on the automated server with jobs enabled to connect the server and repository 224 for synchronization.

Figure 3:
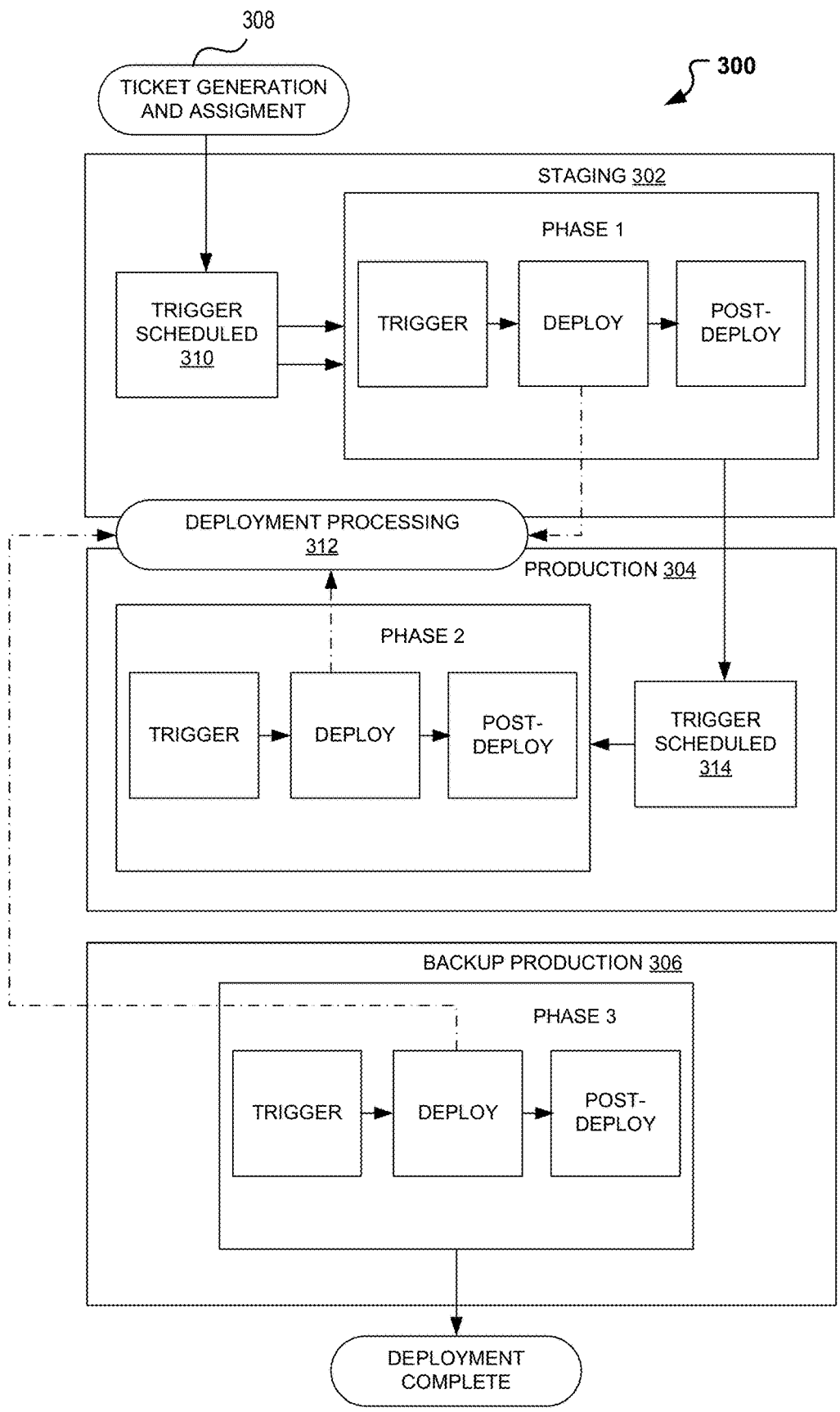
FIG. 3 illustrates an exemplary data flow on the deployment system.

Now, because deployment system 200 is designed to orchestrate code release and deployment, FIG. 3 is presented introducing the flow. In particular, FIG. 3 illustrates an exemplary data flow 300 on the deployment system 200. The data flow 300 illustrated here includes a request deriving from the chat bot 202 and including a ticket for code deployment. Note that other data flows are possible and may arrive as a request with or without a ticket. For example, status request, application versions, host names, etc., can all be requests by a user at the chat bot 202 which may not require a ticket and/or some or all the steps presented here.

In one embodiment, to begin code deployment on the deployment system 200, a first interaction occurs with the chat bot 202 which consequently generates a ticket and assigns the ticket 308 accordingly. The ticket is then scheduled for staging by the deployment system 200. To schedule the ticket, the deployment system 200 may consider various factors including for example work flow and traffic. Scheduling may occur manually or in an automated manner based in part on checks for correct information submitted on the ticket and/or checks for quality and assurance (QA). In one example, upon ticket generation and assignment 308, the ticket may be approved by QA which once approved triggers the scheduling 310. Note that the deployment system 200 can manage several deployments simultaneously and as such scheduling may occur in parallel, serially, staggered, or a combination thereof.

Once the deployment has been scheduled, the deployment system 200 can route the ticket to the staging environment 302 (e.g., staging 206) wherein as previously indicated, at least some of the software testing may occur. Therefore, based on the type of deployment an update may be completed, and/or code tested, and/or infrastructure change made, etc. This type of testing which can emulate a production environment can occur during a first of three stages which includes a trigger, deploy, and post-deploy processes. These processes can include verification, validation, execution, and quality assurance. Further details regarding the processes are discussed in detail below and in conjunction with FIG. 4. Once the staging 302 or phase 1 of the deployment is complete, deployment processing may commence 312. The deployment process 312 may derive from a deployment repository and may deploy using at least an application which can obtain an image for the container or other source. Concurrently, another trigger may be scheduled 314 to continue to the production environment or phase 2. The trigger schedule 314 may occur in response to a verification that staging 302 or phase 1 was completed and accurate. In one embodiment, the verification and consequently the trigger schedule 314 may occur by one or more members of quality assurance. In other embodiments, the trigger schedule 314 and verification may occur in response to an automated check and verification. Still in other embodiments, the trigger 314 may occur in response to a combination of both a manual and automated verification. In some embodiments, the deployment process and trigger schedule may occur in response to a communication with the chat bot 110 with an indication to continue with the release process.

After quality assurance verifies and approves the ticket for production, the deployment system enters the production environment 304 (e.g., production 208). At the production environment 304 as previously indicated, new code may be deployed, new versions released, and new configurations set. These checks and actions may include at least the trigger, deploy, and post-deploy processes introduced in stage 1. The processes may be put in place and redundant, to ensure tasks may be separated if a failure is encountered. Additionally, if the deployment system 200 goes down, information loss may be minimized.

Again, between staging and production, another quality assurance check may occur for release control and verification. Upon completion, the deployment process 300 may continue to phase 3 of production. Phase 3 may again include the trigger, deploy, and post-deploy check with redundancy incorporated again to minimize impact on deployment. Note that at phase 2 and phase 3 deployment processing may again be initiated or continued using at least an application which can obtain an image for the container or other source. Upon completion for the backup production 306, code or source release has been successfully tested, verified, and deployed and may deployment completed.

Figure 4:
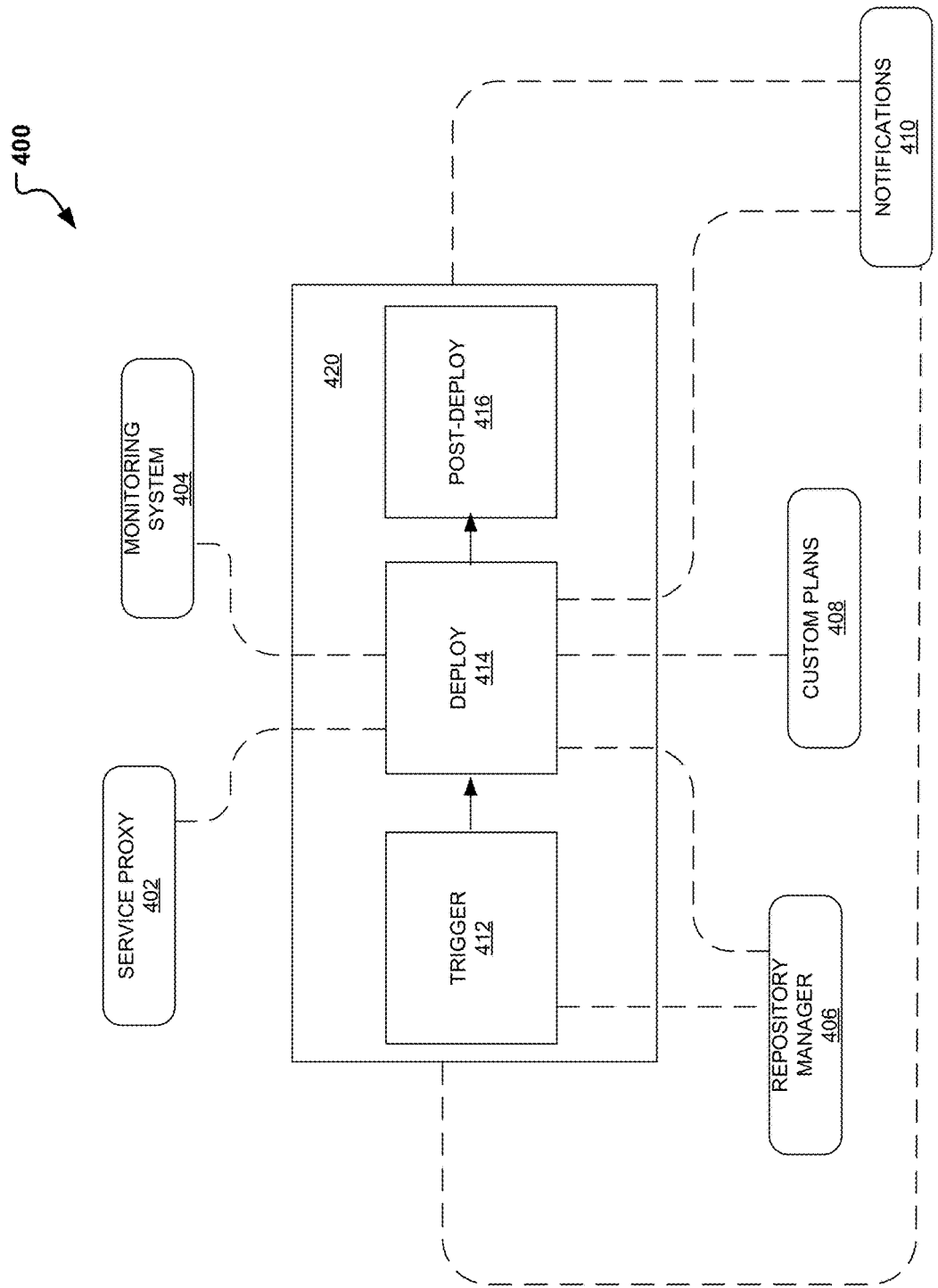
FIG. 4 illustrate exemplary deployment stages of the deployment system.

Note that the process illustrated here is used for exemplary purposes and one or more processed, verifications, and phases may be added and/or removed. The data flow 300 may vary based in part on the type of update to the code and/or application as well as the changes to the infrastructure, version, etc. Now as indicated, trigger, deploy and post-processing are executed on one or more times throughout the data flow. To obtain a better understanding on what is entailed in the process, FIG. 4 is introduced to illustrate data processes 420 and data flow 400 to those processes 420 occurring within the deployment phases 302, 304, 306 of the deployment system 200.

As indicated above and in conjunction with FIG. 3, data processes 420 are processes included within the deployment system and deployment process 300 which may be used for verification, validation, execution, and quality assurance. The data processes 420 may be executed multiple times during deployment and at other instances when code release, version updates, and other software like actions are occurring on the deployment system. Note that unlike traditional methods, this data process redundancy may not exist. For example, in one embodiment, the execution and communication with and between the data processes 420 may occur in an automated manner with the addition of an additional container which may function to ensure deployment as expected. Policies and rules may be put in place to check and make sure the processes and the automation is working correctly.

Now data processes 420 may include one or more processes which may be used to check, verify, and validate during deployment. As illustrated and discussed, in one embodiment, the data processes 420 include a trigger, deploy, and post-deploy process. The trigger process 412 may include the execution, trigger, and generation of a ticket (e.g., JIRA™). During execution, parameter, password, and values may be executed on, authenticated, and enable/disabled based in part on a notification, or ticket requisite. At trigger, actions including application version verification, image promotion to the repository manager, ticket state transition, and creation of feature branches and pushes. Trigger process 412 concludes with pass word authentication, information verification.

Next, the deploy process 414 can include the deployment of a job. In one embodiment, deployment of a job may include validating various steps and processed. For example, validation can include checks (e.g., including verification of adequate disk space on a host, correct permissions, and certifications), clean-up (e.g., removal of unused images), de-registration (e.g., of an application instance on the service proxy 402 to enable application cool down), registration (e.g., register with service proxy 402), release plans, staging, and transmission of deployment information. Finally, at the post-proxy process 416, ticket state transitions, quality assurance approvals, state updates, and feature development may occur.

Additionally, the execution and communication of the data processes 420 may occur from varying system, modules, and components located within and external to the deployment system 200. In one embodiment, the data processes 420 may derive from and include communication with a service proxy 402, a monitoring system 404, a repository manager 406, a custom plans module 408, a notifications component, etc.

The service proxy 402 for example, can work as gateway computer between networks and the deployment system 200. It may aid in enabling and managing messages over the network channels and may be used to initialize, call, open, or close a service as needed by the deployment system. The monitoring system 404 may be a component or software application used in monitoring the deployment system 200, the network, and/or overall infrastructure. Thus, as an error, service, switch, application, etc. goes down or need attention, the monitoring system 404 can aid with alerting. Another example of a component interacting with the data processes 420 can include a repository manager 406. The repository manager 406 may be an extension of a source code repository and store processed (e.g., build processes) during the deployment process 300. Thus, as a build is broken into smaller chunks, the repository manager 406 can help with managing the builds. Yet another component which may interact with the data processes 420 can include a custom release plans module 408. This custom release plan module 408 may interact with the data processes 420 as suggested, to hold, release, and manage custom plans relevant to the software code or deployment in place. A notifications component 410 may also exist in the data flow 400 where notification for open tickets, slack communications, email, etc. may be pushed, stored, or otherwise presented during the operation of the deployment system 200.

Note that additional actions may occur at one or more of the data processes 420 and those provided are for exemplary purposes. Additionally, one or more modules or components may be added and/or removed based in part on the deployment system 200 and the code release, deployment, or other function at hand.

Figure 5:
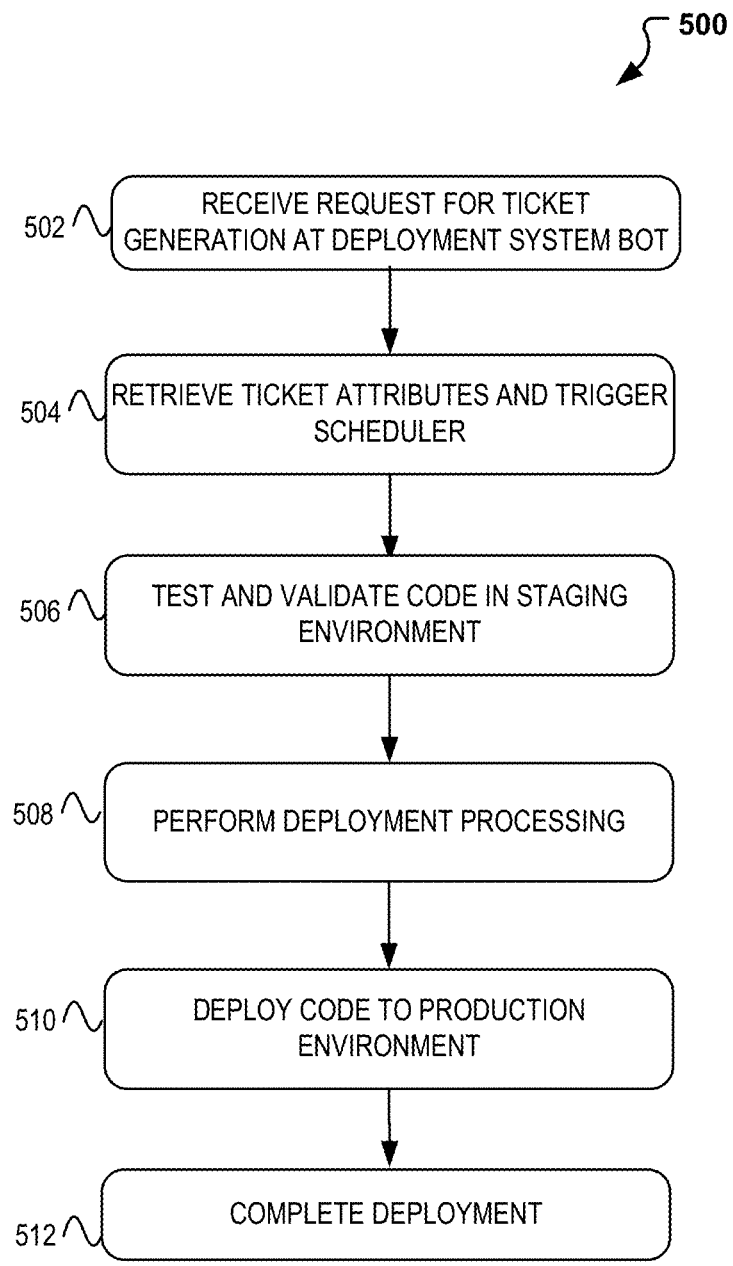
FIG. 5 illustrates a flow diagram illustrating operations for orchestrating data for software release and deployment.
Figure 6:
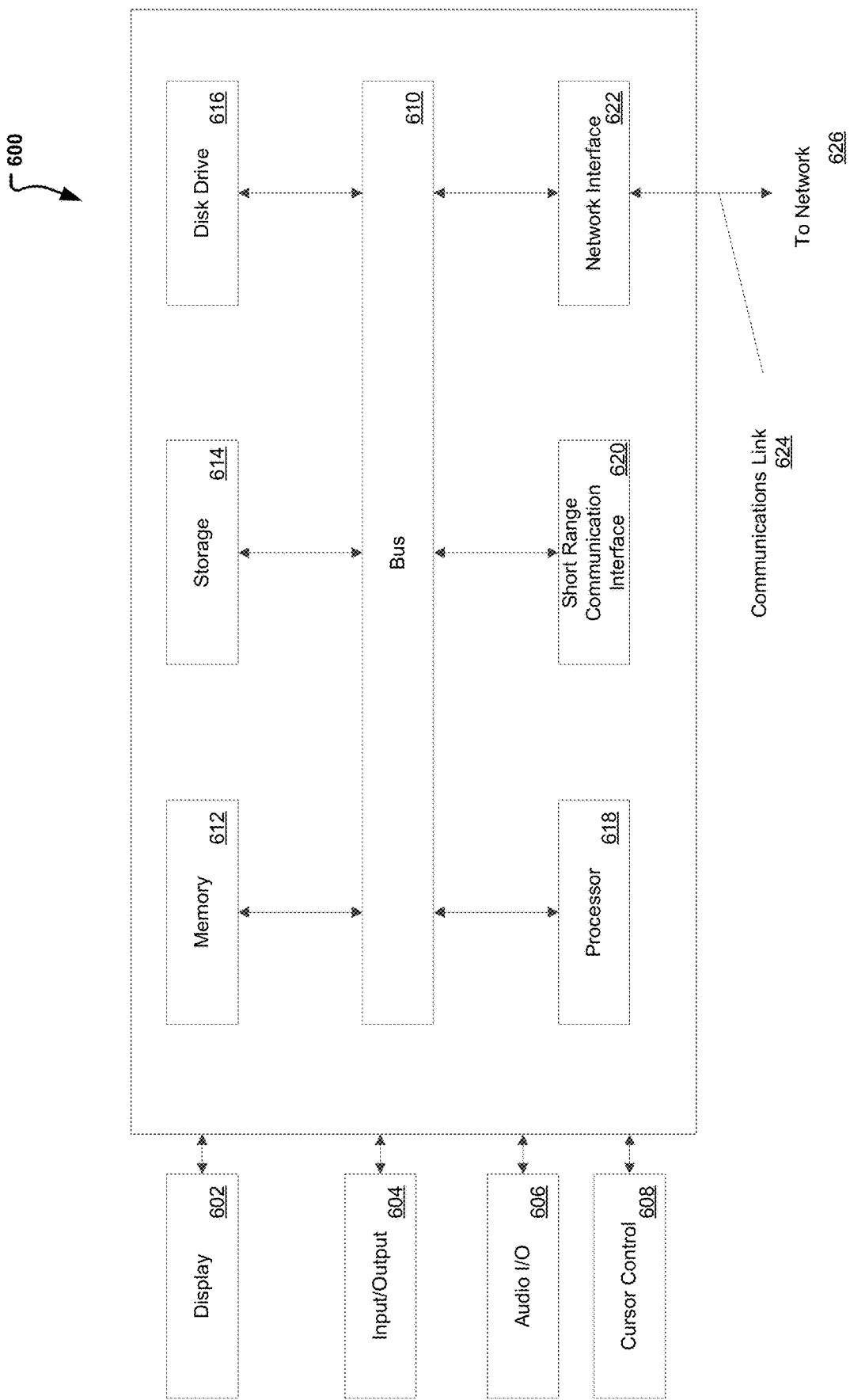
FIG. 6 illustrates an example block diagram of a computer system suitable for implementing one or more devices of the communication systems of FIGS. 1-5.

To illustrate how the application and deployment system may be used, FIG. 5 is introduced which illustrates example process 500 that may be implemented on a system 600 of FIG. 6. In particular, FIG. 5 illustrates a flow diagram illustrating how a deployment system provides the ability to trigger, deploy, and release applications. According to some embodiments, process 500 may include one or more of operations 502-512, which may be implemented, at least in part, in the form of executable code stored on a non-transitory, tangible, machine readable media that, when run on one or more hardware processors, may cause a system to perform one or more of the operations 502-512.

Process 500 may begin with operation 502, where a ticket request may be received at the deployment system 200 and at the chat bot 202. As previously indicated, users may interact with deployment system 200 in a multitude of ways. In one embodiment, a chat bot 202 is introduced which may provide access to an automation server 204 for the release, test, and validation of code. At operation 502, the user communicating with chat bot 202 over a user device 102 may submit a request for code deployment. At receipt of the request, a ticket may be generated and appropriate attributes or configurations with the particular request may be retrieved at operation 504. Note that with the use and communication with the chat bot 202, ticket information and deployment requests may be facilitated as the communication with the chat bot 202 provides a standardized method for requesting and deploying code and/or an application. Thus as the ticket information is obtained and ticket generated, a scheduler may be triggered for the processing of the deployment job. The scheduling may occur in serial or in parallel with other job requests. In addition, the scheduling may be a manual or automated process. Scheduling may occur upon the verification of the ticket information for quality assurance.

At operation 506, once the scheduling is triggered, the process continues to a staging environment 206. As previously indicated, the staging environment 206 may be used to perform at least some of the testing. For example, code may be tested, updates made, and builds completed. The staging environment 206 may be defined to ensure quality is achieved in a production-like environment before and application or code is deployed. As such at operation 506 provides code testing and validation in a staging environment.

Upon completion of such, process 500 may continue to operation 508 where deployment processing 312 may occur. In some embodiments, the deployment process 312 may work jointly with a trigger scheduler 314 in response to a communication with the chat bot 202 with the indication that the code is ready for the production environment and continue with the release process. In the production environment, at operation 510, the deployment system may operate to continue any further software with the processing the code or application release through the production. In the production environment 304, much like in staging environment 304, 306 the code may encounter phase 2 and phase 3 data processed which include a trigger, deploy, and post deploy process for the execution of the code. Unlike conventional systems, the three-phased data processes aid in minimizing data loss and errors which may be encountered in the event of system failure. At operation 512, upon completion of the data processes, verification, and quality assurance check, the code deployment may be completed and finalized.

FIG. 6 illustrates an example computer system 600 in block diagram format suitable for implementing on one or more devices of the system in FIGS. 1-5 and in particular deployment system 200. In various implementations, a device that includes computer system 600 may comprise a personal computing device (e.g., a smart or mobile device, a computing tablet, a personal computer, laptop, wearable device, PDA, etc.) that is capable of communicating with a network 626. A service provider and/or a content provider may utilize a network computing device (e.g., a network server) capable of communicating with the network. It should be appreciated that each of the devices utilized by users, service providers, and content providers may be implemented as computer system 600 in a manner as follows.

Additionally, as more and more devices become communication capable, such as new smart devices using wireless communication to report, track, message, relay information and so forth, these devices may be part of computer system 600. For example, windows, walls, and other objects may double as touch screen devices for users to interact with. Such devices may be incorporated with the systems discussed herein.

Computer system 600 may include a bus 610 or other communication mechanisms for communicating information data, signals, and information between various components of computer system 600. Components include an input/output (I/O) component 604 that processes a user action, such as selecting keys from a keypad/keyboard, selecting one or more buttons, links, actuatable elements, etc., and sending a corresponding signal to bus 610. I/O component 604 may also include an output component, such as a display 602 and a cursor control 608 (such as a keyboard, keypad, mouse, touchscreen, etc.). In some examples, I/O component 604 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 618, which may be a micro-controller, digital signal processor (DSP), or other processing component, that processes these various signals, such as for display on computer system 600 or transmission to other devices over a network 626 via a communication link 624. Again, communication link 624 may be a wireless communication in some embodiments. Processor 618 may also control transmission of information, such as cookies, IP addresses, images, and/or the like to other devices.

Components of computer system 600 also include a system memory component 614 (e.g., RAM), a static storage component 614 (e.g., ROM), and/or a disk drive 616. Computer system 600 performs specific operations by processor 618 and other components by executing one or more sequences of instructions contained in system memory component 612 (e.g., for engagement level determination). Logic may be encoded in a computer readable medium, which may refer to any medium that participates in providing instructions to processor 618 for execution. Such a medium may take many forms, including but not limited to, non-volatile media, volatile media, and/or transmission media. In various implementations, non-volatile media includes optical or magnetic disks, volatile media includes dynamic memory such as system memory component 612, and transmission media includes coaxial cables, copper wire, and fiber optics, including wires that comprise bus 610. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 600 may also include a short-range communications interface 520. Short range communications interface 620, in various embodiments, may include transceiver circuitry, an antenna, and/or waveguide. Short range communications interface 620 may use one or more short-range wireless communication technologies, protocols, and/or standards (e.g., WiFi, Bluetooth®, Bluetooth Low Energy (BLE), infrared, NFC, etc.).

Short range communications interface 620, in various embodiments, may be configured to detect other devices (e.g., device 102, secondary user device 104, etc.) with short range communications technology near computer system 600. Short range communications interface 620 may create a communication area for detecting other devices with short range communication capabilities. When other devices with short range communications capabilities are placed in the communication area of short-range communications interface 620, short range communications interface 620 may detect the other devices and exchange data with the other devices. Short range communications interface 620 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 620 may identify a local area network using a short range communications protocol, such as WiFi, and join the local area network. In some examples, computer system 600 may discover and/or communicate with other devices that are a part of the local area network using short range communications interface 620. In some embodiments, short range communications interface 620 may further exchange data and information with the other devices that are communicatively coupled with short range communications interface 620.

In various embodiments of the present disclosure, execution of instruction sequences to practice the present disclosure may be performed by computer system 600. In various other embodiments of the present disclosure, a plurality of computer systems 600 coupled by communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 624 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise present with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing instructions; and
a processor configured to execute instructions to cause the system to perform operations comprising:
collecting, via a communication platform using a system chat bot, information regarding a code release command made via the communication platform;
detecting, from the information, a request for a ticket generation for deploying a code by the system chat bot;
determining ticket attributes based in part on the request detected using the system chat bot and one or more production scripts, wherein the ticket attributes comprise a requirement for a testing and a validating of the code prior to deploying the code;
iterating a data deployment process on the code for deployment at a staging environment and a production environment based on the ticket attributes; and
deploying the code for a production of the code.

2. The system of claim 1, wherein the data deployment process incorporates a trigger phase, a deploy phase, and a post-deploy phase.

3. The system of claim 1, wherein the staging environment includes the testing and the validating of the code using the data deployment process.

4. The system of claim 1, wherein the production environment includes the testing and the validating of the code using the data deployment process.

5. The system of claim 1, wherein the determining the ticket attributes includes a communication with an automation server for a retrieval of the one or more production scripts used by the system chat bot with the request.

6. The system of claim 2, wherein the deploy phase includes a communication with at least one of a repository manager, a monitoring system, or a service proxy.

7. The system of claim 2, wherein the trigger phase, the deploy phase, and the post-deploy phase include notifications.

8. The system of claim 1, wherein the data deployment process includes deploying using at least an application which can obtain an image for a container.

9. A method comprising:
collecting, via a communication platform using a chat bot, information regarding a code release command made via the communication platform;
generating, from the information, a ticket by an automation server in response to a ticket request received at the chat bot;
triggering a scheduler for a processing of a code for deployment associated with the ticket request using one or more production scripts, wherein the scheduler is triggered with a requirement from the information for a testing and a validating of the code prior to a deployment of the code;
testing the code for the deployment at a staging environment based on the requirement, wherein the testing includes a first post-deploy processing;
validating the code for the deployment at a production environment based on the requirement, wherein the validating includes a second post-deploy processing; and
deploying the code in response to the validating.

10. The method of claim 9, wherein the staging environment includes a first data deployment process incorporating a first trigger process, a first deploy process, and a first post-deploy process.

11. The method of claim 10, wherein the production environment includes a second data deployment process incorporating a second trigger process, a second deploy process, and a second post-deploy process.

12. The method of claim 9, further comprising:
determining a ticket attribute associated with the ticket generated, wherein the determining the ticket attribute includes a communication with the automation server for a retrieval of the one or more production scripts used by the chat bot with the ticket request.

13. The method of claim 11, wherein at least one of the first data deployment process or the second data deployment process includes a communication with at least one of a repository manager, a monitoring system, or a service proxy.

14. The method of claim 11, wherein at least one of the first data deployment process or the second data deployment process include notifications.

15. The method of claim 11, wherein at least one of the first data deployment process or the second data deployment process includes deploying using at least an application which can obtain an image for a container.

16. A non-transitory machine-readable medium having stored thereon machine-readable instructions executable to cause a machine to perform operations comprising:
collecting, via a communication platform using a system chat bot, information regarding a code release command made via the communication platform;
detecting, from the information, a request for a ticket generation for deploying a code by the system chat bot;
determining ticket attributes based in part on the request detected using the system chat bot and one or more production scripts, wherein the ticket attributes comprise a requirement for a testing and a validating of the code prior to deploying the code;
iterating a data deployment process on the code for deployment at a staging environment and a production environment based on the ticket attributes; and
deploying the code for a production of the code.

17. The non-transitory machine-readable medium of claim 16, wherein the staging environment includes the data deployment process incorporating a trigger process, a deploy process, and a post-deploy process.

18. The non-transitory machine-readable medium of claim 16, wherein the production environment includes the data deployment process incorporating a trigger process, a deploy process, and a post-deploy process.

19. The non-transitory machine-readable medium of claim 16, wherein determining the ticket attributes includes a communication with an automation server for a retrieval of the one or more production scripts used by the system chat bot with the request.

20. The non-transitory machine-readable medium of claim 17, wherein the data deployment process includes deploying using at least an application which can obtain an image for a container.

\* \* \* \* \*